United States Patent [19]
Graham et al.

[11] 3,725,397
[45] Apr. 3, 1973

[54] METHOD OF PRODUCING 7β-ACYLAMIDO-3-METHYLCEPH-3-EM-4-CARBOXYLIC ACID ESTERS AND CATALYSTS THEREFOR

[75] Inventors: William Graham, Pinner; Lewis A. Wetherill, North Wembley, both of England

[73] Assignee: Glaxo Laboratories Limited, Greenford, Middlesex, England

[22] Filed: Mar. 10, 1970

[21] Appl. No.: 18,284

[30] Foreign Application Priority Data

Dec. 5, 1969 Great Britain.....................59,450/69

[52] U.S. Cl................................260/243 C, 424/246
[51] Int. Cl................................................C07d 99/24
[58] Field of Search....................................260/243 C

[56] References Cited

UNITED STATES PATENTS 3,275,626  9/1966  Morin et al. ......................260/243 C

*Primary Examiner*—Nicholas S. Rizzo
*Attorney*—Bacon & Thomas

[57] ABSTRACT

The invention relates to a process for the preparation of 7β-acylamido-3-methylceph-3-em-4-carboxylic acid esters from compounds of the penicillin type, in particular, 6β-acylamido penicillanic acid 1-oxide esters, in the presence of a catalyst selected from a mono-O-substituted orthophosphoric acid, an 0,0-di(aryl substituted) orthophosphoric acid, a salt or complex formed from a nitrogen base having a pKb of not less than 4 and a mono-0-substituted orthophosphoric acid or an 0,0-di(aryl substituted) orthophosphoric acid. The salt or complex may be formed in situ in the reaction mixture.

10 Claims, No Drawings

METHOD OF PRODUCING 7β-ACYLAMIDO-3-METHYLCEPH-3-EM-4-CARBOXYLIC ACID ESTERS AND CATALYSTS THEREFOR

This invention is concerned with an improved process for obtaining cephalosporin compounds. In particular the invention is concerned with the conversion of penicillin type compounds into cephalosporin type compounds.

The compounds referred to in this specification are generally named with reference to penicillanic acid and cepham. Penicillanic acid has the structure:

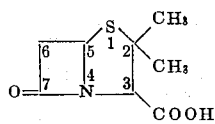

I and cepham has the structure:

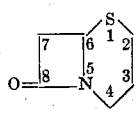

II (see J.A.C.S. 1962, 84, 3,400 and J. Chem. Soc. 1965, 5,031). The term "cephem" refers to the basic cepham structure with a single double bond.

Cephalosporin antibiotics are of great interest in that a number of them are of value in the treatment of infections caused by pathogenic bacteria some of which are resistant to other antibiotics. Penicillin compounds are, currently, produced in greater quantities on an industrial scale than are cephalosporin compounds and with the continually increasing interest in cephalosporin compounds it is highly desirable to have available alternative techniques for producing the latter such as a simple process for converting compounds of the penicillin type into cephalosporins.

The invention is thus principally concerned with the conversion of 6β-acylamidopenicillanic acid 1-oxide esters into 7β-acylamido-3-methylceph-3-em-4-carboxylic acid esters.

In U.S. Pat. No. 3,275,626 there is described a general method for preparing antibiotic substances, including cephalosporins, which comprises heating a so-called penicillin sulphoxide, under acid conditions, to a temperature of from about 100°C to about 175°C.

It is an object of the invention to provide an improved process for the rearrangement of penicillin compounds to cephalosporin compounds. We have found that the rearrangement can be effected in good yields by means of certain acids and certain derivatives thereof which exist as salts or complexes. It is not certain in each instance whether they are true salts or complexes. For convenience we have described them as being salts although it should be understood that the term "salts" is interchangeable with "complexes". Moreover, under the conditions of the reaction the salt or complex may exist in a dissociated form.

According to an embodiment of the present invention therefore there is provided a process for the preparation of 7β-acylamido-3-methylceph-3-em-4-carboxylic acid esters comprising rearranging a 6β-acylamidopenicillanic acid 1-oxide ester (referred to herein for convenience as the penicillin oxide) in the presence of a catalyst selected from a mono-0-substituted orthophosphoric acid, an 0,0-di(aryl substituted) orthophosphoric acid, a salt formed from a nitrogen base having a pKb of not less than 4 and a mono-0-substituted orthophosphoric acid or an 0,0-di(aryl substituted) orthophosphoric acid, which salt may be formed in situ in the reaction mixture, or a mixture of two or more of said catalysts.

The process according to the invention is advantageous as compared with the use of orthophosphoric acid from the point of view of ease and economy of operation and/or increased yields. Furthermore the process according to the invention may give rise to end products of high purity.

The mono-0-substituted orthophosphoric acid may be an aliphatic, araliphatic or aryl dihydrogen phosphate, the aliphatic, araliphatic or aryl group of which may be a hydrocarbon group, e.g. an alkyl group such as a lower alkyl group, a phenylalkyl group such as a phenyl lower alkyl group or a phenyl group, or such a hydrocarbon group substituted by one or more atoms or groups such as a halogen atom or a nitro group. Examples of aryl dihydrogen phosphates include phenyl dihydrogen phosphate, p-nitrophenyl dihydrogen phosphate and 2-chloromethyl-4-nitrophenyl dihydrogen phosphate whilst an example of an aliphatic dihydrogen phosphate is 2,2,2-trichloroethyl dihydrogen phosphate.

The 0,0-di(aryl substituted) orthophosphoric acid may be substituted by phenyl groups or by phenyl groups substituted in turn by one or more atoms or groups such as a halogen atom or a nitro group. An example of a diaryl hydrogen phosphate is bis (4-nitrophenyl) hydrogen phosphate.

The nitrogen base may be either inorganic or organic. The expression "nitrogen base" is used herein as a convenient expression for a basic substance containing nitrogen although it may include other hetero atoms e.g. oxygen. We prefer however to use organic amines. Bases which may be used have a pKb for protonation of not less than 4 (i.e. as measured in water at 25°C). The base may be a polyfunctional base having a nitrogen function with such a pKb for the first protonation step. The bases preferably have a pKb in water of not less than 7.

The organic base may be primary, secondary or tertiary; however, we prefer to employ weak tertiary organic bases. Illustrative of such tertiary organic bases are the unsaturated heterocyclic bases such as pyridine, quinoline, isoquinoline, benzimidazole and homologues and/or substituted derivatives thereof, for example the alkyl substituted pyridines and quinolines such as α-, β-, and γ-picolines and 2- and 4-methylquinolines. Other substituted heterocyclic bases which may be used include those substituted by halogen (e.g. chlorine or bromine), acyl (e.g. formyl or acetyl), acylamido (e.g. acetamido), cyano, carboxy, aldoximino and the like.

Other organic bases which may be used include aniline and nuclear substituted anilines such as halogeno anilines (e.g. o-chloroaniline, m-chloroaniline and p-chloroaniline); lower alkyl anilines (e.g. o-methylaniline and m-methylaniline); hydroxy- and lower alkoxyanilines (e.g. o-methoxyaniline and m-hydroxyaniline); nitroanilines (e.g. m-nitroaniline) and carboxyanilines (e.g. m-carboxyaniline) as well as N-lower alkyl anilines (e.g. N-methylaniline).

Preferred classes of salts or nitrogen bases are those obtained by reaction of the substituted phosphoric acid with an aromatic heterocyclic, tertiary, organic nitrogen base. Advantageous results may be obtained in the process according to the invention when salts or complexes with pyridine, quinoline, isoquinoline or derivatives thereof or such bases substituted by, for example, lower alkyl, halogen, acyl, acylamido, cyano, carboxy, or aldoximino are employed.

The salts for use in the process according to the invention may be derived from proportions of the acid and the base such that one or more of the acidic function(s) is exactly neutralized by the base. Generally, we prefer to use molar equivalents of the base and the acid. If desired, however, molar proportions other than those specified above may be used, for example, a less than molar quantity of nitrogen base may be employed so that, in addition to the salt, the catalyst also comprises some free acid. Alternatively, a more than molar quantity of nitrogen base may be employed to produce a salt the average composition of which corresponds to a material intermediate to a mono- or di- (nitrogen base) salt. The base may be used in excess of the total molar requirement to neutralize the acid function(s) but should not be used in large excess e.g. it should generally not be used in amounts of 5 molar excess and greater.

The optimal ratio of the acid base will depend on various factors including the nature of the acid and of the base as well as the nature of the penicillin oxide. The optimal ratio may be ascertained by preliminary trial and experiment.

The salts employed in the process according to the invention constitute a further embodiment thereof. An important salt according to the invention is pyridinium 2,2,2-trichloroethyl dihydrogen phosphate.

The process according to the invention is conveniently carried out in an organic solvent since one may regulate more exactly reaction conditions such as temperature. Ordinarily, the penicillin oxide will be in solution in the organic solvent. The solvent should be substantially inert to the penicillin oxide used in the process and to the cephalosporin produced by the process.

Solvents which may be used include those described in U.S. Pat. No. 3,275,626 and other publications describing the rearrangement reaction. However, particularly suitable solvents include ketones boiling at from 75–120°C (e.g. 100–120°C), esters boiling at from 75–140°C (e.g. 100–130°C), dioxan and diethylene glycol dimethyl ether (diglyme). Illustrative of those ketones and esters that may be used in the process according to the invention are aliphatic ketones and esters having appropriate boiling points including ethyl methyl ketone, isobutyl methyl ketone, methyl n-propyl ketone, n-propyl acetate, n-butyl acetate, iso-butyl acetate, sec-butyl acetate and diethyl carbonate.

The time for achieving optimum yields by the process according to the invention varies according to the particular solvent employed. The rearrangements are conveniently carried out at the boiling point of the chosen solvent and, for those solvents boiling in the lower part of the ranges quoted above, correspondingly longer reaction times, e.g. up to 48 hours, may be required than for those solvents boiling at higher temperatures. Rearrangements in dioxan generally require times of 3–24 hours, preferably 5–12 hours, to achieve optimum results whereas those carried out in methyl isobutyl ketone generally require times of 1–8 hours. The yields in the rearrangements are dependent, but to a lesser extent, on the concentration of the catalyst in the solvent, correspondingly longer reaction times being required for lower concentrations of catalyst. In general acid catalysts require longer times than the corresponding salts with nitrogen bases.

We particularly prefer to use dioxan as the organic solvent. Penicillin oxides can be dissolved in this solvent in high concentration and in general there is no falling off of yield with increase of concentration up to concentrations of the order of 35 percent.

The quantity of the catalyst used should not generally exceed 1.0 mole per mole of the penicillin oxide; however, we generally prefer to use catalysts in proportions of from 0.01 to 0.2 mole per mole of penicillin oxide. A preferred catalyst proportion is 0.06 mole per mole.

The catalysts used in the process according to the invention produce comparatively little color during the rearrangement as compared with similar rearrangements carried out in the presence of an acid catalyst such as a hydrocarbyl sulphonic acid. By-products commonly formed with such acid catalysts appear to only a much smaller extent with the catalysts herein described. The use of salts in particular, has the practical advantage that, under our preferred conditions, it is unnecessary to use decolorizing agents and acid binding agents before removing the reaction solvent.

The appropriate time interval for any particular reaction may be determined by testing the reaction solution by one or more of the following procedures:

1. Thin layer chromatography, for example on silica gel, developing with a 2:1 mixture of benzene and ethyl acetate and rendering the spots visible by treatment with an iodine/azide solution (Russell, Nature, 1960, 186, 788). Where, for example, the starting material is the 2,2,2-trichloroethyl ester of 6β-phenylacetamidopenicillanic acid 1β-oxide, the product ($R_F$ 0.64) gives an orange/brown color whereas the starting material ($R_F$ 0.5) gives a dark yellow color.

2. Determination of the rotation after suitable dilution of the reaction mixture with for example, chloroform. Using the same starting material as in (1) the rotation drops to between about a third to about a quarter of the initial value.

3. Determination of the ultraviolet spectrum of a sample of the reaction mixture suitably diluted with ethyl alcohol. Using the same starting material as in (1) the calculated value for $E_{1cm.}^{1\ percent\ at}$ 264 nm rises to about 100 for a successful reaction. Absorption maxima at higher wavelengths are preferably low or absent. This determination cannot be adopted when ketonic solvents are used as the reaction media.

Although satisfactory yields can be obtained by carrying out the reaction under normal reflux, it may be possible to improve the yields by inserting a desiccating agent (e.g. alumina, calcium oxide, sodium hydroxide or molecular sieves) which is inert to the solvent in the reflux return line to remove water formed during the reaction. Alternatively the water formed during the reaction may be removed by the use of a fractionating column, the water formed being removed by fractional distillation.

After completion of the reaction the catalyst may be removed either before or after concentrating the reaction mixture. If the reaction solvent is immiscible with water, the salt can be removed by a simple washing procedure. On the other hand, if the reaction medium is miscible with water a convenient purification technique is to remove the reaction solvent (this may be achieved by distillation under reduced pressure) and then to purify the residue by any convenient process e.g. chromatography on silica gel.

If an acid catalyst has been used in the process according to the invention it is desirable to remove this before concentrating the reaction mixture. As before, if the reaction solvent is immiscible with water, the catalyst can be removed by a simple washing procedure. On the other hand, if the reaction medium is miscible with water a convenient method of removing the acid catalyst is to treat the reaction mixture with a finely divided neutralizing agent such as calcium carbonate or magnesium oxide, followed by filtration in the presence of a filter aid. The reaction solvent is then removed, conveniently under reduced pressure, and the residue purified by any convenient process e.g. chromatography on silica gel.

It has been found, however, that the degree of conversion achieved by the process according to the invention may be such that complicated purification procedures can be dispensed with and the product isolated in a substantially pure condition by pouring the reaction mixture into water, filtering off the product and if desired further purifying by recrystallization from, or slurrying with, a suitable solvent.

When using, for example, a mono-pyridinium salt of a mono-substituted phosphoric acid in dioxan solution, it is necessary only to evaporate off the solvent and to crystallize the product from a suitable solvent in order to obtain a high yield of substantially pure product.

A color removal step e.g. by means of charcoal may be employed; however this is not normally necessary under the preferred conditions of the process according to the invention.

The penicillin oxide used as starting material in the process according to the invention may be derived from a salt of 6β-phenylacetamidopenicillanic acid or of 6β-phenoxyacetamidopenicillanic acid obtained, for example, from a fermentation process, by esterification of the carboxyl group at the 3-position of the penicillanic acid and oxidation of the sulphur atom at the 1-position. Alternatively the penicillin oxide may be obtained from 6β-aminopenicillanic acid by acylation of the amino group at the 6β-position, esterification of the carboxyl group at the 3-position, and oxidation of the sulphur at the 1-position.

The oxidation may be carried out as described by Chow, Hall and Hoover (J. Org. Chem. 1962, 27, 1381). The penicillin compound is mixed with the oxidizing agent in an amount such that at least one atom of active oxygen is present per atom of thiazolidine sulphur. Suitable oxidizing agents include metaperiodic acid, peracetic acid, monoperphathalic acid, m-chloroperbenzoic acid and t-butylhypochlorite, the latter being preferably used in admixture with a weak base, e.g. pyridine. Excess oxidizing agents may lead to the formation of 1,1-dioxide. The 1-oxide may be obtained in the α- and/or β-form.

Acyl groups at the 6β-amino position of the penicillin oxide may be any desired acyl group but should preferably be reasonably stable under the conditions of the rearrangement.

Conveniently the acyl group at the 6β-position is that of a penicillin obtained by a fermentation process e.g. phenylacetyl or phenoxyacetyl. Such a group may not be the desired group in the cephalosporin end-product but this can be introduced by subsequent transformations described below. Another group which may conveniently be used is the formyl group.

Alternatively, the acyl group at the 6β-position of the penicillin oxide may be that desired in the cephalosporin compound, e.g. a thienylacetyl or phenylglyoxylyl group, or it may be a precursor for the desired acyl group e.g. an acyl group containing a protected functional group such as a protected amino group. An example of such an acyl group is a protected β-aminophenylacetyl group.

The amine protecting group is conveniently one which can subsequently be removed by reduction or hydrolysis without affecting the rest of the molecule, especially the lactam and 7β-amido linkages of the resulting cephalosporin compound. A similar protecting group may also be used as the esterifying group at the 3-COOH position and both groups can be simultaneously removed as described below. An advantageous procedure is to remove both groups at the last stage in the sequence. Protected groups include urethane, arylmethyl (e.g. trityl)-amino, arylmethyleneamino, sulphenylamino and enamine types. Such groups can in general be removed by one or more reagents selected from dilute mineral acids, e.g. dilute hydrochloric acid, concentrated organic acids, e.g. concentrated acetic acid, trifluoroacetic acid, and liquid hydrogen bromide at very low temperatures, e.g. −80°C. A convenient protecting group is the tertiary butoxycarbonyl group, which is readily removed by hydrolysis with dilute mineral acid, e.g. dilute hydrochloric acid, or preferably with a strong organic acid, (e.g. formic acid or tri-fluoroacetic acid), e.g. at a temperature of 0–40°C., preferably at room temperature (15 – 25°C). Another convenient protecting group is the 2,2,2-trichloroethoxycarbonyl group which may be split off by an agent such as zinc in acetic acid, formic acid, lower alcohols or pyridine.

The ester of the penicillanic acid is preferably formed with an alcohol or phenol which may readily be split off, e.g. by hydrolysis or reduction, at a later stage to yield the subsequently formed ceph-3-em compound as the free acid. Alcohol and phenol residues which may readily be split off include those containing electron-attracting substituents for example sulpho groups and esterified carboxyl groups, these groups may be subsequently split off by alkaline reagents. Benzyl and o-benzyloxyphenoxy ester groups may be removed by hydrogenolysis although this may involve catalyst poisoning. A preferred method of removal involves acid cleavage and groups which may be removed by acid cleavage include adamantyl, t-butyl, benzyl residues such as anisyl and the residues of alkanols containing electron donors in the α-position such as acyloxy, alkoxy, benzoyloxy, substituted benzoloxy, halogen, alkylthio, phenyl, alkoxyphenyl or aromatic heterocyclic. These radicals may be derived from benzyl alcohols such as p-methoxybenzyl alcohol, di-p-methoxyphenylmethanol, triphenylmethanol, diphenylmethanol, benzoyloxymethanol, benzoylmethanol, p-nitrobenzyl alcohol and furfuryl alcohol.

Alcohol residues which may be readily split off subsequently by a reducing agent are those of a 2,2,2-trihalogenoethanol, e.g. 2,2,2-tricholoroethanol, p-nitrobenzyl alcohol or 4-pyridylmethanol. 2,2,2-Trihalogenoethyl groups may conveniently be removed by zinc/acetic acid, zinc/formic acid, zinc/lower alcohol or zinc/pyridine or by chromous reagents; p-nitrobenzyl groups may conveniently be removed by hydrogenolysis and 4-pyridylmethyl groups may conveniently be removed by electrolytic reduction.

Where the ester group is subsequently removed by an acid catalyzed reaction, this may be effected by using formic acid or trifluroacetic acid (preferably in conjunction with anisole) or alternatively by using hydrochloric acid e.g. in admixture with acetic acid.

We particularly prefer to use those penicillin oxides having a diphenylmethoxycarboxyl, a 2,2,2-trichloroethoxycarbonyl, a t-butoxycarbonyl, a p-nitrobenzyloxycarbonyl, benzoylmethoxycarbonyl or p-methoxybenzyloxycarbonyl group at the 3-position in the process according to the invention because the ceph-3-em compounds formed from esters of this type do not appear to undergo appreciable $\Delta^3 \rightarrow \Delta^2$ isomerization in the de-esterification reaction.

Where the product of the rearrangement is a 7$\beta$-acylamidoceph-3-em compound not having the desired acyl group, the 7$\beta$-acylamido compound may be N-deacylated, if desired after reactions elsewhere in the molecule, to yield the corresponding 7$\beta$-amino compound and the latter acylated with an appropriate acylating reagent.

Methods of N-deacylating cephalosporin derivatives having 7$\beta$-acylamido groups are known and one suitable method comprises treating a 7$\beta$-acylamidoceph-3-em-4-carboxylic acid ester with an imide-halide forming component, converting the imide halide so obtained into the imino ether and decomposing the latter. If desired, the ester group may be split off by hydrolysis or hydrogenolysis to yield the 4-carboxylic acid. Suitable readily removable ester groups are described above.

Suitable imide halide forming components include acid halides derived from the phosphorous acids, the preferred compounds being the chlorides such as, for example, phosphorous oxychloride or phosphorous pentachloride.

This method of N-deacylation is described in greater detail in Belgian Patent No. 719,712.

N-Deformylation of a 7$\beta$-formamido group may be effected with a mineral acid at a temperature of minus 15° to 100°C, preferably +15 to 40°C. A convenient reagent for the N-deformylation is concentrated hydrochloric acid in methanol or, preferably, in dioxan or tetrahydrofuran since undesirable transesterification reactions that tend to occur in methanol are thereby avoided.

In order that the invention may be well understood the following examples are given by way of illustration only.

In the examples, unless otherwise stated, thin layer chromatography (TLC) was carried out on silica gel using a mixture of benzene and ethyl acetate (2:1) as the developing solvent and detecting the spots with iodine/azide solution.

EXAMPLE 1

2,2,2-Trichloroethyl 6$\beta$-phenylacetamidopenicillanate 1$\beta$-oxide (9.64 g.; 20 m.moles), phenyl dihydrogen phosphate (0.244 g.; 1.4 m.moles) and pyridine (0.114 ml; 1.4 m.moles) were boiled under reflux in dry peroxide-free dioxan (50 ml.) and the condensate was run through a column of desiccant (Woelm basic alumina 30 g.) before being returned to the reaction flask. The progress of the reaction was followed by TLC. After 8 hours reflux no starting material remained. The solution was cooled to ca 30° and poured into water (82.5 ml.) with stirring. The solid was isolated by filtration, washed with water (100 ml.) and the damp cake slurried with a 3:1 mixture of ethanol/water (30 ml.). The solid was filtered off, washed with the 3:1 ethanol/water (30 ml.) and dried in vacuo at 40° to give 2,2,2-trichloroethyl 3-methyl-7$\beta$-phenylacetamido-ceph-3-em-4-carboxylate (7.396 g.; 80.6 percent of theory) m.p. 159 – 60° (corrected); $[\alpha]_D$ +54° (c, 0.8 in CHCl$_3$); $\lambda_{max.}$ (ethanol) 264 nm ($E_{1cm.}^{1\ percent} = 129$).

EXAMPLE 2

2,2,2-Trichloroethyl 6$\beta$-phenylacetamidopenicillanate 1$\beta$-oxide (19.28 g.; 40 m.moles), pyridinium 2,2,2-trichloroethyl dihydrogen phosphate (0.494 g.; 1.6 m.moles) and pyridine (0.13 ml.; 1.6 m.moles) were refluxed in dioxan (96.4 ml.) as described in Example 1. Reaction was complete after 5½ hours. The cooled solution was poured into stirred water (150 ml.). The solid was isolated by filtration and the damp cake slurried with isopropyl alcohol (41.5 ml.). The solid was filtered off and washed with a 2.3:1 mixture of isopropyl alcohol to water (50 ml. slurry wash, 75 ml. displacement wash) and dried at 40° in vacuo to give 2,2,2-trichloroethyl 3-methyl-7$\beta$-phenylacetamidoceph-3-em-4-carboxylate (15.22 g.; 82 percent of theory), m.p. 161 – 4° (corrected $[\alpha]_D$ + 54° (c, 0.8 in CHCl$_3$); $\lambda_{max.}$ (ethanol) 264 nm ($E_{1cm.}^{1\ percent}$ 132.5).

EXAMPLE 3

2,2,2-Trichloroethyl 6$\beta$-phenylacetamidopenicillanate 1$\beta$-oxide (9.64 g.; 20 m.moles) and pyridinium 4-nitrophenyl dihydrogen phosphate (0.298 g.; 1 m.mole) were refluxed in dioxan (50 ml.) as described in Example 1.

After 6½ hours reflux the solvent was evaporated under reduced pressure and the residue triturated with warm industrial methylated spirits (IMS) (10 ml.). The mixture was stored at 0° for 2 days. The solid was filtered off, washed with IMS (10 ml. slurry wash, 10 ml. displacement wash) and dried in vacuo at 40° to give 2,2,2-trichloroethyl 3-methyl-7$\beta$-phenylacetamidoceph-3-em-4-carboxylate (6.71 g.; 72.3 percent of theory) m.p. 162 – 6° (corrected) $[\alpha]_D$ +53.4° (c, 1.0 in CHCl$_3$), $\lambda_{max.}$ (ethanol) 264 nm ($E_{1cm.}^{1\ percent}$ 134.6).

A second crop (0.7 g.; 7.5 percent of theory) was obtained by concentration of the bulked IMS liquors m.p. 160 – 5° (corrected) $[\alpha]_D$ +53.5° (c, 0.9 in CHCl$_3$) $\lambda_{max.}$ (ethanol) 264 nm ($E_{1cm.}^{1\ percent}$ 135.8).

EXAMPLE 4

2,2,2-Trichloroethyl 6β-phenylacetamidopenicillanate 1β-oxide (9.6 g.; 20 m.mole) and pyridinium 2-chloromethyl-4-nitrophenyl dihydrogen phosphate (0.277 g.; 0.8 m.moles) were refluxed in dioxan (50 ml.) as described in Example 1. The reaction was complete after 5 hours. The cooled solution was poured into stirred water (82.5 ml.). The product was isolated in an identical manner to that described in Example 3 to give, after drying at 40° in vacuo, 2,2,2-trichloroethyl 3-methyl- 7β-phenylacetamidoceph-3-em-4-carboxylate (7.30 g.; 78.5 percent of theory), m.p. 160 – 163° (corrected), $[\alpha]_D$ + 52.3° (c, 0.6 in CHCl$_3$), $\lambda_{max.}$ (ethanol) 264 nm ($E_{1cm.}^{1\ percent}$ 135).

EXAMPLE 5

2,2,2-Trichloroethyl 6β-phenylacetamidopenicillanate 1β-oxide (100 g.; 0.2076 mole), pyridinium 2,2,2-trichloroethyl dihydrogen phosphate (3.84 g.; 12.5 m.moles) were refluxed in dioxan (500 ml.) as described in Example 1. Reaction was complete after 6½ hours. The product was isolated in the manner described in Example 2 to give 2,2,2-trichloroethyl 3-methyl-7β-phenylacetamidoceph-3-em-4-carboxylate (79.3 g.; 82.3 percent theory), m.p. 161 – 4° (corrected) $[\alpha]_D$ + 52° (c, 0.5 in CHCl$_3$), $\lambda_{max.}$ (ethanol) 264 nm ($E_{1cm.}^{1\ percent}$ 131.5).

EXAMPLE 6

2,2,2-Trichloroethyl 6β-phenylacetamidopenicillanate 1β-oxide (100 g.; 0.2076 mole), pyridinium 2,2,2-trichloroethyl dihydrogen phosphate (3.84 g.; 12.5 m.mole) were refluxed in dioxan (500 ml.) as described in Example 1. On completion of the reaction the cooled mixture was added over 20 minutes to stirred water (1 l.). The resulting solid was removed by filtration, washed with water and dried at 40° in vacuo to give 2,2,2-trichloroethyl 3-methyl-7β-phenylacetamidoceph-3-em-4-carboxylate as a pale yellow solid (95 g.; 98 percent of theory), m.p. 152 – 5° (corrected), $[\alpha]_D$ + 59.8° (c, 0.6 in CHCl$_3$), $\lambda_{max.}$ (ethanol) 264 nm ($E_{1cm.}^{1\ percent}$ 123).

EXAMPLE 7

Orthophosphoric acid ester salts 2,2,2-Trichloroethyl dihydrogen phosphate monopyridine salt A solution of 2,2,2-trichloroethyl dihydrogen phosphate (460 g.) in isopropyl ether (2 l.) was stirred and pyridine (160 ml.) was added from a dropping funnel over 15 minutes, then the solid isolated by filtration, washed with isopropyl ether (500 ml.) and dried at 40° in vacuo to give 2,2,2-trichloroethyl dihydrogen phosphate pyridine salt (580 g.; 93.6 percent of theory). Recrystallization from ethanol gave material (394 g.; 68 percent recovery), m.p. 101 – 103°.

Found: C, 27.3; H, 3.0; N, 4.5; Cl, 34.2.
C$_7$H$_9$O$_4$NPCl$_3$ requires: C, 27.3; H, 2.9; N, 4.5; Cl, 34.5 percent.

The following salts were prepared in a similar manner.

Salts of R—O—P(=O)(OH)—OH

TABLE 1

| Example | Acid R= | Base | Solvent |
|---|---|---|---|
| 8 | Phenyl | Quinoline | Acetone |
| 9 | 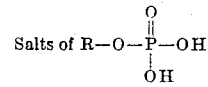 | Pyridine | " |
| 10 | NO$_2$—C$_6$H$_4$— | " | " |

TABLE 1.—Continued

| | | Salt | | | | | | | |
|---|---|---|---|---|---|---|---|---|---|
| | M.P., °C. | Found | | | | | Requires | | |
| Ex. | (corr.) | C | H | Cl | N | Formula | C | H | Cl | N |
| 8 | 123–5 | 59.3 | 4.7 | | 4.4 | C$_{11}$H$_{14}$O$_4$NP | 59.4 | 4.7 | | 4.6 |
| 9 | 137–8 | 41.8 | 3.8 | 10.1 | 7.7 | C$_{12}$H$_{12}$O$_6$N$_2$PCl | 41.6 | 3.5 | 10.2 | 8.1 |
| 10 | 131–5 | 44.4 | 3.8 | | 9.3 | C$_{11}$H$_{11}$O$_6$N$_2$P | 44.3 | 3.7 | | 9.4 |

EXAMPLE 11

Example 1 was repeated using quinolinium phenyl dihydrogen phosphate (preparation given in Example 8) (0.6064 g.; 2 m. moles). The reaction time was 7½ hours. The work-up was performed in a similar fashion to give 2,2,2-trichloroethyl 3-methyl-7β-phenylacetamidoceph-3-em-4-carboxylate (6.88 g.; 74.9 percent of theory), m.p. 160 – 162° (corrected); $[\alpha]_D$ + 53.2° (c, 0.8 in CHCl$_3$); $\lambda_{max.}$ (ethanol) 264 nm. ($E_{1cm.}^{1\ percent}$ 128.2).

EXAMPLE 12

Reaction of 2,2,2-trichloroethyl-6β-phenylacetamidopenicillanate 1β-oxide (9.54 g.; 20 m.mole), α-naphthyl dihydrogen phosphate (225 mg.; 1 m.mole) and pyridine (79 mg.; 1 m.mole) with conditions as in Example 1 and work-up technique as in Example 2 gave 2,2,2-trichloroethyl 3-methyl-7β-phenylacetamidoceph-3-em-4-carboxylate (6.5 g.; 70 percent of theory), m.p. 161–3° (corrected); $[\alpha]_D$ + 53.7° (c, 0.8 in CHCl$_3$); $\lambda_{max.}$ (ethanol) 264 nm ($E_{1cm.}^{1\ percent}$ 132).

EXAMPLE 13

Reaction of 2,2,2-trichloroethyl-6β-phenylacetamidopenicillanate 1β-oxide (9.64 g.; 20 m.moles), o-carboxyphenyl dihydrogen phosphate (218 mg.; 1 m.mole) and pyridine (79 mg.; 1 m.mole) with conditions as in Example 1 and work-up technique as in Example 2 gave 2,2,2-trichloroethyl-3-methyl-7β-phenylacetamidoceph-3-em-4-carboxylate (6.7 g.; 72.2 percent of theory), m.p. 154 – 9°C (corrected); $[\alpha]_D$ +

53.6° (c, 0.8 in CHCl$_3$); $\lambda_{max}$. (ethanol) 264 nm; ($E_{1cm}^{1\ percent}$ 130).

EXAMPLE 14

A repeat of Example 13 using more pyridine (157 mg.; 2 m.moles) gave 2,2,2-trichloroethyl 3-methyl-7β-phenylacetamidoceph-3-em-4-carboxylate (6.7 g.; 72.2 percent of theory), m.p. 155 – 9° (corrected); $[\alpha]_D$ + 54.4° (c, 0.8 in CHCl$_3$); $\lambda_{max}$. (ethanol) 264 nm; ($E_{1cm}^{1\ percent}$ 133).

EXAMPLE 15

2,2,2-Trichloroethyl 6β-phenylacetamidopenicillanate 1β-oxide (9.63 g.; 20 m.mole) was heated under reflux in dioxan (50 ml.) with 2-chloromethyl-4-nitrophenyl dihydrogen phosphate (214 mg.; 0.8 m.mole). After 8 hours, when the reaction was complete, the solution was cooled and poured into stirred water (82.5 ml.). The solid was filtered off and washed with isopropanol/water (2.3:1, 1 slurry wash 125 ml. and 1 displacement wash 60 ml.). After drying the solid (7.6 g.; 81.8 percent, m.p. 155 – 9° (corrected) was re-washed with ether (30 ml.) and dried in vacuo overnight to give 2,2,2-trichloroethyl 3-methyl-7β-phenylacetamidoceph-3-em-4-carboxylate (7.0 g.; 76 percent of theory), m.p. 160 – 62° (corrected), $[\alpha]_D$ + 53.3° (c, 0.8, CHCl$_3$), $\lambda_{max}$. (EtOH) 264 nm, $E_{1cm}^{1\ percent}$ 132.

EXAMPLE 16

2,2,2-Trichloroethyl 6β-phenylacetamidopenicillanate 1β-oxide (100 g.; 0.208 mole) and 2,2,2-trichloroethyl dihydrogen phosphate (3.84 g.; 0.08 mole equivalent) were boiled under reflux in dioxan (500 ml.). The reaction was complete after 10½ hours. The mixture was cooled and poured into water and the resulting crude product slurried with aqueous isopropyl alcohol and dried in vacuo to give 2,2,2-trichloroethyl 3-methyl-7β-phenylacetamidoceph-3-em-4-carboxylate (76 g.; 78.9 percent of theory) m.p. 157–59° (corrected), $[\alpha]_D$ + 54° (c, 0.8 in CHCl$_3$), $\lambda_{max}$. (EtOH) 264 nm, $E_{1cm}^{1\ percent}$ 134.

EXAMPLE 17

To 2,2,2-trichloroethyl 6β-phenylacetamidopenicillanate 1β-oxide (9.64 g. 20 m.mole) in dioxan (50 ml.) was added 4-nitrophenyl dihydrogen phosphate (438 mg. 2 m.mole) and the solution was refluxed in a manner such that the condensed dioxan ran down through a column of Woelm basic alumina (30 g.) before returning to the reaction vessel. After 6 hours reflux the solution was decanted and evaporated to dryness under reduced pressure. The residue was triturated with warm IMS (10 ml.), and the solution refrigerated overnight.

The solid was filtered off, washed with IMS (slurry 10 ml., displacement 10 ml.) and dried in vacuo at 40°C to constant weight to give 2,2,2-trichloroethyl 3-methyl-7β-phenylacetamidoceph-3-em-4-carboxylate (5.65 g.; 60.8 percent theory) m.p. 161–6°; $[\alpha]_D$ + 51° (CHCl$_3$, 0.9); $\lambda_{max}$. 264 nm, $E_{1cm}^{1\ percent}$ 136 (ethanol).

EXAMPLE 18

To 2,2,2-trichloroethyl 6β-phenylacetamido penicillanate 1β-oxide (19.28 g. 40 m.mole) in dioxan (100 ml.) was added pyridine (158 mg. 2 m. mole) and pyridinium 4-nitrophenyl hydrogen phosphate (596 mg. 2 m.mole) and the stirred solution was refluxed for 6½ hours in a manner such that the condensed dioxan vapors ran down through a column of Woelm basic alumina (30 g.) before returning to the reaction vessel.

The solution was added dropwise with stirring to water (165 ml.) and the resulting precipitate was filtered off, washed with water and dried in vacuo at 40°C. to constant weight to give a yield of 17.43 g. (94 percent). The total crude product was twice slurried with a 7:3 isopropanol:water mixture (53 ml.) and displacement washed on the filter twice with a similar mixture (25 ml.). The solid was dried in vacuo at 40°C. to constant weight to give 2,2,2-trichloroethyl 3-methyl-7β-phenylacetamidoceph-3-em-4-carboxylate m.p. 160–3°AC; $[\alpha]_D$ 54.8 (CHCl$_3$, 0.6); $\lambda_{max}$. 264 nm, $E_{1cm}^{1\ percent}$ 130.2 (ethanol).

EXAMPLE 19

To 2,2,2-trichloroethyl 6β-phenylacetamidopenicillanate 1β-oxide (9.64 g., 20 m.mole) in dioxan (50 ml.) was added bis (4-nitrophenyl) hydrogen phosphate (340 mg. 1 m.mole) and the solution was refluxed in a manner such that the condensed dioxan vapors ran through a column of alumina before returning to the reaction vessel. The solution was refluxed for 31¼hours, decanted hours, decanted and evaporated to dryness under reduced pressure. The residue was triturated with IMS (10 ml.), refrigerated and the solid filtered off, washed with IMS (5 ml. slurry, 5 ml. displacement) and dried in vacuo at 40° C. to constant weight to give 2,2,2-trichloroethyl 3-methyl-7β-phenylacetamidoceph-3-em-4-carboxylate (2.88 g.; 31.1 percent of theory) m.p. 161–4°C, $[\alpha]_D$ 53.6°(CHCl$_3$, 0.8), $\lambda_{max}$. 264 nm $E_{1cm}^{1\ percent}$ 137.8(ethanol).

EXAMPLE 20

To 2,2,2-trichloroethyl 6β-phenylacetamidopenicillanate 1β-oxide (8.57 g., 17.8 .mole) in dioxan (43 ml.) was added bis(p-nitrophenyl)hydrogen phosphate (303 mg. 0.89 m.mole) and pyridine (70.4 mg., 0.89 m.mole) and the solution was refluxed for nine hours in a manner such that the condensed dioxan vapors ran through a column of Woelm basic alumina (30 g.) before returning to the reaction vessel. The solution was evaporated to dryness under reduced pressure, the residue triturated with warm IMS (10 ml.) and refrigerated overnight. The solid was filtered off, washed with IMS (10 ml. slurry, 10 ml. displacement) and dried in vacuo at 40°C to constant weight, to give 2,2,2-trichloroethyl 3-methyl-7β-phenylacetamidoceph-3-em-4-carboxylate (3.948 g., 42.56 percent) m.p. 162–5°C, $[\alpha]_D$ 52.8° (CHCl$_3$, 1.0), $\lambda_{max}$. 264 nm $E_{1cm}^{1\ percent}$ 134 (ethanol).

EXAMPLE 21 p-Methoxybenzyl 6β-phenylacetamidopenicillanate 1β-oxide (9.41 g., 20 m.mole), monopyridinium 2,2,2-trichloroethyl dihydrogen phosphate (0.665 g., 2.16 m.mole) and pyridine (0.316 g., 4 m.mole) were boiled under reflux in dry peroxide-free dioxan (200 ml.) so that the condensate passed through molecular sieves (Linde 4A 1/16 inch : 40 g.) before returning to the reaction flask. TLC (benzene-ethyl acetate:1:1) showed that no starting material was present after 16 hours. The solution was cooled and the dioxan was evaporated under reduced pressure. The residue was crystallized from boiling methanol (225 ml.) to give cream needles of p-methoxybenzyl 3-methyl-7β-phenylacetamidoceph-3-em-4-carboxylate (6.70 g., 74.0 percent) m.p. 151–153°$[\alpha]_D$ + 39° (c, 0.82 in $CHCl_3$), $\lambda_{max.}$ (ethanol) 226 nm ($E_{1cm.}^{1\ percent}$ 365) and 268 nm ($E_{1cm.}^{1\ percent}$ 170). Evaporation of the filtrate and crystallization of the residue from methanol (15 ml.) gave a second crop (0.50 g., 5.5 percent), m.p. 148–153°$[\alpha]_D$ + 36° (c, 1.13 $CHCl_3$), $\lambda_{max.}$ (ethanol) 226 nm ($E_{1cm.}^{1\ percent}$ 349) and 268 nm ($E_{1cm.}^{1\ percent}$ 158).

We claim:

1. In a process for the preparation of 7β-acylamido-3-methyl-ceph-3-em-4-carboxylic acid esters by heating a 6β-acylamidopenicillanic acid 1-oxide ester in the presence of a catalyst, the improvement which comprises employing as catalyst, a catalyst selected from the group consisting of a lower alkyl, phenyl lower alkyl or phenyl dihydrogen phosphate or such a dihydrogen phosphate in which the lower alkyl, phenyl lower alkyl or phenyl group is substituted by at least one of a halogen atom or a nitro group; a diphenyl hydrogen phosphate or such a hydrogen phosphate in which the phenyl group is substituted by at least one of a halogen atom or a nitro group; a salt formed from a nitrogen base having a pKb of at least 4 with said dihydrogen phosphate and a salt formed from a nitrogen base having a pKb of at least 4 with said hydrogen phosphate.

2. A process as defined in claim 1 wherein said catalyst is said dihydrogen phosphate.

3. A process as defined in claim 1 wherein said catalyst is a dihydrogen phosphate selected from the group consisting of phenyl dihydrogen phosphate, p-nitrophenyl dihydrogen phosphate, 2-chloromethyl-4-nitrophenyl dihydrogen phosphate and 2,2,2-trichloroethyl dihydrogen phosphate.

4. A process as defined in claim 1 wherein said base is an unsaturated heterocyclic tertiary base selected from the group consisting of pyridine, quinoline, isoquinoline, benzimidazole and lower alkyl derivatives thereof.

5. A process as defined in claim 1 wherein said nitrogen base is selected from the group consisting of aniline, an N-lower alkyl aniline, a chloroaniline, a lower alkyl aniline, a hydroxy aniline, a lower alkoxy aniline, a nitroaniline and a carboxyaniline, the named substituted anilines being otherwise unsubstituted.

6. A process as defined in claim 1 wherein said salt is obtained by the reaction of one molar equivalent of the dihydrogen phosphate or hydrogen phosphate with one or two molar equivalents of said nitrogen base or about two molar equivalents of said nitrogen base with one molar equivalent of the dihydrogen phosphate or hydrogen phosphate.

7. A process as defined in claim 1 in which a proportion of said salt not exceeding 1.0 mole per mole of penicillin oxide is used.

8. A process as defined in claim 7 wherein the proportion of said salt is from 0.01 to 0.2 mole per mole of penicillin oxide.

9. A process as defined in claim 1 wherein a solvent selected from the group consisting of dioxan, ethyl methyl ketone, isobutyl methyl ketone, methyl n-propyl ketone, n-propyl acetate, n-butyl acetate, isobutyl acetate, sec-butyl acetate, diethyl carbonate and diethylene glycol dimethyl ether is employed.

10. A process as defined in claim 9 in which the reaction is effected at the boiling point of the solvent and wherein a desiccating agent, which is inert under the reaction conditions, is inserted in a reflux return line to remove water formed during the reaction.

* * * * *